United States Patent
Schmedding et al.

(10) Patent No.: US 6,805,896 B2
(45) Date of Patent: Oct. 19, 2004

(54) DRY CLOUDING AGENT FOR DRY BEVERAGE MIXES AND METHOD FOR MANUFACTURE THEREOF

(75) Inventors: Diederik Schmedding, Kortenhoef (NL); Henk Kremer, Almere (NL); Bert Sloot, Hilversum (NL)

(73) Assignee: Quest International B.V., Naarden (NL)

( * ) Notice: Subject to any disclaimer, the term of this patent is extended or adjusted under 35 U.S.C. 154(b) by 131 days.

(21) Appl. No.: 10/183,942

(22) Filed: Jun. 28, 2002

(65) Prior Publication Data

US 2003/0035878 A1 Feb. 20, 2003

(30) Foreign Application Priority Data

Jun. 29, 2001 (EP) ............................................ 01202509

(51) Int. Cl.⁷ ................................................. A23L 2/39
(52) U.S. Cl. ....................................... 426/590; 426/250
(58) Field of Search ................................ 426/250, 590, 426/591, 599

(56) References Cited

U.S. PATENT DOCUMENTS 3,023,106 A * 2/1962 Common
3,658,552 A * 4/1972 Carlson
4,187,326 A * 2/1980 Serafino
4,529,613 A * 7/1985 Mezzino
5,571,334 A * 11/1996 Dunn
6,159,522 A * 12/2000 Chuang

FOREIGN PATENT DOCUMENTS

EP 0029473 * 11/1979
EP 0 029 473 A1 6/1981

* cited by examiner

*Primary Examiner*—Carolyn Paden
(74) *Attorney, Agent, or Firm*—Fitch, Even, Tabin & Flannery

(57) ABSTRACT

The invention relates to a dry clouding agent for dry beverage mixes prepared by drying an aqueous mixture, which on a dry weight basis, comprises (a) from 15 to 35% by weight of finely divided $TiO_2$;
(b) from 35 to 55% by weight of a suspending agent; and
(c) from 20 to 40% by weight of a spacing agent with the proviso that the weight ratio of $TiO_2$ to suspending agent is 1:1.1 to 1:3.

Further the invention relates to a method for producing said clouding agent which can be used in dry beverage mixes. Those beverage mixes provide increased opacity stability properties in the aqueous produced therefrom.

14 Claims, No Drawings

DRY CLOUDING AGENT FOR DRY BEVERAGE MIXES AND METHOD FOR MANUFACTURE THEREOF

FIELD OF THE INVENTION

The present invention is directed to a titanium dioxide containing clouding agent for particulate dry beverage mixes, to a method of producing the clouding agent as well as to dry beverage mixes containing the clouding atent. The clouding agent provides a perfect stability and intensity of the opacity in aqueous beverages produced from the dry beverage mixes.

BACKGROUND OF THE INVENTION

Dry beverage mixes, particularly imitation fruit juice beverage mixes are typically formulated with a particulate clouding agent in order to imitate the opacity of a natural juice. Most clouding agents are based on an oil or a solid phase dispersed in an aqueous (continuous) phase. The dispersed oil/solid phase needs to be stabilised in order to avoid respectively "creaming" or "sedimentation". In instant powder beverages, these clouding agents are equally based on oils or solids. The oil based systems need to be encapsulated in order to transfer them into a powder form. The stability requirements of the clouding agent when dispersed in the ready to drink beverage are less extreme than for liquid beverages, but still require a certain stability. Most clouding agents are prepared by combining titanium dioxide with a suspending agent like gum arabic and a spacing agent such as maltodextrin. Titanium dioxide is the key ingredient, which provides opacity as essential part of the clouding agent. U.S. Pat. No. 4,187,326 discloses a particulate clouding agent for dry mix beverages containing $TiO_2$. U.S. Pat. No. 4,259,613 describes a particulate, dry beverage mix clouding agent containing up to 20% by weight $TiO_2$.

In typical methods of preparing a clouding agent, including the methods described in U.S. Pat. Nos. 4,187,326 and 4,529,613, the spacing agent and suspending agent are added to water and subjected to high shear mixing. The titanium dioxide is added after the spacing agent and suspending agents are dispersed by the initial high shear mixing and the mixture is again subjected to further high shear mixing. The resulting slurry is then dried, typically by spray drying. The resulting co-dried clouding agent may then be included in a dry beverage mix, particularly a fruit flavoured dry beverage mix.

However, there are several drawbacks associated with these conventional clouding agents and methods of preparation thereof. One problem is that while it is desirable to have a relatively high level of titanium dioxide to provide the right whiteness or opacity, the amount of titanium dioxide which may be included in the clouding agent is limited because of its tendency to precipitate out and create sedimentation in the reconstituted beverage. Another problem is that in these conventional methods of preparing clouding agents, the inner surfaces of the processing vessels tend to become caked, requiring significant cleaning efforts before subsequent batches may be manufactured. Loss of the ingredients in this way also reduces yield. It has been found that in these prior art processes, higher titanium dioxide content in the slurry made it harder to spray dry the slurry, further reducing yield and lowering throughput.

Further U.S. Pat. No. 6,159,522 discloses a specific method of making a particulate clouding agent for a dry beverage mix comprising:

(a) subjecting particulate titanium dioxide and water to high shear mixing to form a first aqueous mixture;

(b) adding a spacing agent and a suspending agent to said first aqueous mixture and subjecting the mixture to high shear mixing to form a farther aqueous mixture; and (c) drying the further aqueous mixture to form a particulate clouding agent.

However, apart from the fact that there is a need for two separate mixing steps the clouding agent obtained does not provide adequate stability properties regarding the opacity of aqueous beverages produced therefrom.

Accordingly there is a need for a clouding agent providing an increased opacity stability in aqueous beverages produced therefrom and there is a need for an adequate and simple method for producing said clouding agent.

SUMMARY OF THE INVENTION

The foregoing and other objects which will be apparent to those of ordinary skill in the art are achieved in accordance with the invention by providing a dry clouding system for dry beverage mixes prepared by drying an aqueous mixture, which on a solid basis, comprises:

(a) from 15 to 35% by weight of finely divided $TiO_2$;

(b) from 35 to 55% by weight of a suspending agent; and (c) from 20 to 40% by weight of a spacing agent with the proviso that the weight ratio of $TiO_2$ to suspending agent is 1:1.1 to 1:3.

The outcome of the invention is considered very surprising in the light of Comparison Example A disclosed in U.S. Pat. No. 6,159,522. In said Comparative Example A a suspending agent (gum arabic), $TiO_2$ and a spacing agent (maltodextrin) were subjected to a shear mixing in water resulting in sticky deposits of material on the walls of the processing vessels. Such detrimental phenomena do not occur with the clouding agent according to the invention.

The particulate titanium dioxide and other constituents of the clouding system are food grade. The titanium dioxide has a size in the range of 0.01–20 microns, preferably 0.1–5 microns.

The suspending agent is suitably a gum, such as the different types of Acacia gums, like gum arabic, Xanthan gum, pectic substances such as pectin, derivatives such as octenyl succinilated starch. Other suitable suspending agents are described in U.S. Pat. No. 4,187,326 and U.S. Pat. No. 4,529,613 discussed above. It is of course also possible to use a mixture of suspending agents.

The spacing agent or filler functions to disperse and maintain the titanium dioxide as separate particles. The spacing agent which typically has particle size distribution of 90% minimum trough 140 mesh and 50% maximum through 325 mesh (US mesh size) is suitably a water-soluble oligomeric carbohydrates including maltodextrins and other starch hydrolysates. Suitable maltodextrins are bland in flavor and without appreciable sweetness. Preferred maltodextrins have a DE of less than 20, preferably from 5 to 20. It is also possible to employ a mixture of spacing agents.

It is a key aspect of the invention that the weight ratio of $TiO_2$ to suspending agent is 1:1.1 to 1:3 preferably 1:1.3 to 1:3 and most preferably 1:1.5 to 1:2.5.

In the method of this invention, the solids are subjected to high shear mixing with water. Typically, this water needs to have a hardness of <10D. Preferably, demineralised water is used. Various types of high shear mixers may be employed such as those described in U.S. Pat. No. 4,187,326 and U.S. Pat. No. 4,529,613. A homogenizer is required, and an in-line high shear mixer is particularly preferred. A suitable tip speed of mixing is generally in the range of 10 to 50 m/s, preferably 18 to 25 m/s. In general a mixing time of from 10 to 300 minutes for the pre-mixing step is suitable.

The total amount of key ingredients (i.e. $TiO_2$, suspending agent and spacing agent) is suitably from 20 to 45% and preferably from 25 to 35% by weight based on the aqueous mixture.

Preferably, the total amount of $TiO_2$ is from 20 to 35% by weight on a dry weight basis, most preferably from 25 to 35% by weight on a dry weight basis.

As indicated above the suspending agent is suitably present in an amount from 35 to 55%, preferably from 40 to 50% by weight on a dry weight basis, with the proviso that the weight ratio $TiO_2$ to suspending agent is in the range of 1:1.1 to 1:3.

The spacing agent is suitably present in an amount of from 20 to 40%, preferably 30 to 40% by weight on a dry weight basis.

The water content of the aqueous mixture is suitably from 55 to 80% and preferably from 65 to 75% by weight, based on the weight of the aqueous mixture.

After preparation of the aqueous mixture by high shear mixing as described above, the aqueous mixture is dried, preferably by spray drying, to form a particulate, co-dried clouding agent for a dry beverage mix. Other methods of drying, such as freeze drying, fluidized bed drying, vacuum drying, air drying, or drum drying may be used. The spray dried product may be diluted with neutral powders, like maltodextrins, in order to simplify dosing and mixing of the clouding agent in the beverage mix.

The amount of the key ingredients in the dried product will be the same as given above. Moisture content of the dried product is suitably less than 6% and preferably less than 5% by weight, based on the weight of the product.

A flow control agent is preferably included to enhance flow of the particulate product. A particulate flow control agent, such as tricalcium phosphate ("TCP"), is preferred. TCP is preferably included in a spray-dried product by addition as a particulate powder to the spray-drying tower. The amount of flow control agent is suitably from 0.1% to 5% and preferably 1% to 3% by weight based on the weight of the dried product. The particulate clouding agent is intended to be utilized in dry beverage mixes such as those described in U.S. Pat. No. 4,187,326 and U.S. Pat. No. 4,529,613. Preferred dry beverage mixes are fruit-flavored and may include a natural and/or artificial sweetener. Typical ingredients of such dry beverage mixes include food grade acids, such as tartaric acid and citric acid, coloring, fruit or other flavors, and other ingredients such as vitamins. The amount of clouding agent included in a dry beverage mix is suitably from 0.01% to 10% and preferably from 0.2% to 7.0% by weight based on the weight of the sweetener-free dry beverage mix. The particle size of the particulate clouding agent is suitably 90% minimum through 140 mesh and 50% maximum through 325 mesh.

EXAMPLE 1

A formulation was prepared by dissolving or dispersing carbohydrate matrix consisting of 60 wt. % gum arabic (IPL11931) (450 gram), 20 wt. % maltodextrin (DE 10) (IPL09473) (150 gram) and 20 wt. % sucrose (IPL01517) (150 gram) under stirring (650 rpm) in warm water (1125 gram) of 60° C. for 30 minutes. The obtained mixture was cooled to 20° C. Subsequently TiO2 (IPL33853) (250 gram) was added to the mixture in an amount of 25 wt. % on total dry solids under stirring (650 rpm) and the prepared product was homogenised using an Ultra Turrax T50 at 10.000 rpm for about 3 minutes. The homogenised feed containing 45% by weight was then removed from the Ultra Turrax vessel and spray-dried in a NIRO LAB MINOR using a rotary plate atomiser at 20.000 rpm. Inlet air temperature was kept at 190° C., resulting in an outlet temperature of about 90° C.

After use the empty Turrax vessel was found to be clean with little or no material stuck to the bottom or sidewalls of the vessel. Then the spray-dried product was used as a clouding agent in a dry beverage mix consisting of

| | |
|---|---|
| quinoline yellow 10% in dextrose | 4.00 |
| sunset yellow FCS 10% in dextrose | 1.30 |
| orange flavour | 8.00 |
| neutral cloud | 1.00 |
| citric acid 0 aq. | 40.50 |
| ascorbic acid | 1.00 |
| sugar | 936.49 |
| trisodiumcitrate | 2.61 |
| tricalciumphosphate | 5.10 |
| | 1000.00 |

After mixing the obtained dry beverage mix with water (dosage 100,00 g/l) a beverage was obtained having an opacity, stability of which was determined by visually observation of the ready to drink beverage in a 1000 ml cylinder and remained for at least one day.

More in particular the spray dried clouding agent was used in an amount of 0.1 g/l on the ready-to-drink beverage prepared from the dry beverage mix. Present in the ready to drink beverage were 95 g/l sugar, 4 g/l citric acid, 0,3 g/l trisodium citrate and 0.5 g/l tricalcium phosphate. Generally, 0.8 g/l of the encapsulated flavour is sufficient to give taste and smell in the final product.

Comparative Example A

For elucidating the essence of the proviso regarding tie weight ratio of $TiO_2$ versus the suspending agent of 1:1.1 to 1:3 the following experiment was carried out.

The procedure of Example 1 was followed except that 360 g of gum arabic, 120 g of sucrose, 120 g of maltodextrin and 400 g of $TiO_2$ were added to 900 g of water; the weight ratio of $TiO_2$ versus suspending agent was 400 g: 360 g, i.e, 1:0.9.

The obtained ready to drink beverage showed a fast deposit formation of $TiO_2$ illustrating the criticality of the ratio of $TiO_2$ versus suspending agent.

What is claimed is:

1. A dry clouding agent for dry beverage mixes prepared by drying an aqueous mixture, which on a dry weight basis, comprises
   (a) from 15 to 35% by weight of finely divided $TiO_2$;
   (b) from 35 to 55% by weight of a suspending agent; and
   (c) from 20 to 40% by weight of a spacing agent with the proviso that the weight ratio of $TiO_2$ to suspending agent is 1:1.1 to 1:3.

2. The dry clouding agent according to claim 1, wherein the $TiO_2$ particles have a size in the range of 0.01–20 microns.

3. The dry clouding agent according to claim 2, wherein the $TiO_2$ particles having a size in the image of 0.1–5 microns.

4. The dry clouding agent according to claim 1 or 2, wherein the suspending agent is selected from the group consisting of gums, pectic substances and starch derivatives.

5. The dry clouding agent according to claim 4, wherein said gums are selected from the class of Acacia gums, said pectic substances are pectin and said starch derivatives are octenyl succinilated starch.

6. The dry clouding agent according to claim 1 or 2, wherein the spacing agent is selected from the group consisting of water-soluble oligomeric carbohydrates.

7. The dry clouding agent according to claim 6, wherein the spacing agent is a maltodextrin.

8. The dry clouding agent according to claim 1 or 2, wherein the weight ratio of $TiO_2$ to suspending agent is 1:1.3 to 1:3.

9. The dry clouding agent according to claim 8, wherein the weight ratio is 1:1.5 to 1:2.5.

10. A method of making a dry clouding agent for dry beverage mixes comprising
   (a) subjecting a combination of 15 to 35%, by weight on a dry weight basis, of particulate $TiO_2$, 35 to 55%, by weight on a dry weight basis, of a suspending agent, 20 to 40% by weight on a dry weight basis, of a spacing agent, and water, wherein the weight ratio of $TiO_2$ to suspending agent is 1:1.1 to 1:3, to high smear mixing; and
   (b) drying the obtained aqueous mixture to form a particulate clouding system.

11. The method according to claim 10, wherein the total amount of $TiO_2$, suspending agent and spacing agent on a dry weight basis is from 20 to 45% by weight $TiO_2$;

from 35 to 55% by weight of a suspending agent; and from 20 to 40% by weight of a spacing agent.

12. The method according to claim 10 or 11, wherein the total amount of $TiO_2$, suspending agent and spacing agent in said obtained aqueous mixture is from 20 to 45% by weight, based on the weight of dry solids.

13. A dry beverage mix containing the clouding agent according to claim 1 or the dry clouding agent obtained by the method according to claim 6, wherein the clouding agent is present at a level of from 0.01% to 10% by weight of the total dry beverage mix.

14. A dry beverage mix according to claim 13, wherein the dry clouding agent is present at a level of from 0.2% to 7% by weight of the total dry beverage mix.

* * * * *